United States Patent
Fox et al.

[11] Patent Number: 5,943,624
[45] Date of Patent: Aug. 24, 1999

[54] CONTACTLESS SMARTCARD FOR USE IN CELLULAR TELEPHONE

[75] Inventors: Thomas Michael Fox, Gilbert; Gerald Vincent Piosenka, Scottsdale; Kenneth Henry Schmidt, Mesa, all of Ariz.

[73] Assignee: Motorola, Inc., Schaumburg, Ill.

[21] Appl. No.: 08/680,448

[22] Filed: Jul. 15, 1996

[51] Int. Cl.[6] .................................................. H04Q 7/32
[52] U.S. Cl. ........................ 455/556; 455/558; 455/406
[58] Field of Search ................................... 455/550, 556, 455/557–58, 552, 418, 419, 406, 407; 235/380, 382; 379/356, 357

[56] References Cited

U.S. PATENT DOCUMENTS

| | | | |
|---|---|---|---|
| 5,221,838 | 6/1993 | Gutman et al. | 235/379 |
| 5,241,161 | 8/1993 | Zuta | 235/382 |
| 5,724,417 | 3/1998 | Bartholomew et al. | 379/211 |
| 5,742,910 | 4/1998 | Gallant et al. | 455/550 |

*Primary Examiner*—Dwayne D. Bost
*Assistant Examiner*—William G. Trost
*Attorney, Agent, or Firm*—Frank J. Bogacz

[57] ABSTRACT

A cellular telephone (10) incorporates the electronics for implementing both a cellular telephone function (46) and a smartcard function (45). This allows the electronics to be protected from damage by the housing associated with the cellular telephone and also decreases the likelihood that the smartcard will be lost or stolen. The cellular telephone 10 also includes an RF interface (40) for wireless communication between the smartcard and an external reader. Further, by making use of the cellular telephone function, information associated with the smartcard function may be updated or modified via existing cellular telephone infrastructure.

14 Claims, 5 Drawing Sheets

5,943,624

CONTACTLESS SMARTCARD FOR USE IN CELLULAR TELEPHONE

BACKGROUND OF THE INVENTION

This invention relates to smartcard electronic devices and, more particularly, to the incorporation of smartcard devices in a cellular telephone for enhanced verification, security and accessibility to data stored on the smartcard.

Smartcards are fast becoming the common media to transfer information of many types relative to banking, transportation, subscriber, health, identification, etc. Typically, smartcards are housed within a plastic card, taking the form and size, for example, of a plastic credit card. Such smartcards include a microcomputer having some form of memory for storing and processing data. When a transaction within the capability of the smartcard is to be performed, the smartcard interacts with an external system which may be, for example, an automated teller machine, a merchant's point of sale system, etc. In performing such a transaction, typically the smartcard is inserted into a card reader associated with the external system through which electrical contact is made between the card reader and the smartcard. However, such systems requiring the smartcard to come into contact with the external system suffer from the disadvantages that the smartcard must be physically inserted into the external reader, the contacts between the smartcard and the external reader must be aligned for proper signal transfer, and the contacts may become worn or dirty thereby causing unreliability through signal degradation or signal interruption.

Additionally, the incorporation of a smartcard within a plastic-type credit card presents additional problems. First, the user of a smartcard typically places a smartcard in a wallet, billfold, purse, or pocket when not in use. As a result, the plastic smartcard must be flexible in order to prevent the card from breaking. However, this flexibility requirement presents its own problem in that the electronics incorporated onto the flexible smartcard may be damaged when the smartcard is flexed. Second, it is desirable to hermetically seal the electronics within the plastic card in order to protect the electronic parts. However, this substantially increases the cost of the card. Third, small plastic smartcards are easy to misplace, lose, or steal thereby resulting in the user being without their smartcard as well as a third party having unauthorized access to their smartcard.

Accordingly, it would be desirable to incorporate the electronics associated with a smartcard into an alternate housing arrangement so as to overcome problems and disadvantages associated with flexible plastic smartcards.

Additionally, it would be desirable to provide a smartcard that does not require contact with an external reader in order to perform a transaction.

BRIEF DESCRIPTION OF THE DRAWINGS

A more complete understanding of the present invention may be derived by referring to the detailed description and claims when considered in conjunction with the drawings, wherein like reference numbers refer to similar items throughout the drawings; and wherein

DETAILED DESCRIPTION OF THE DRAWINGS

Figure 1:
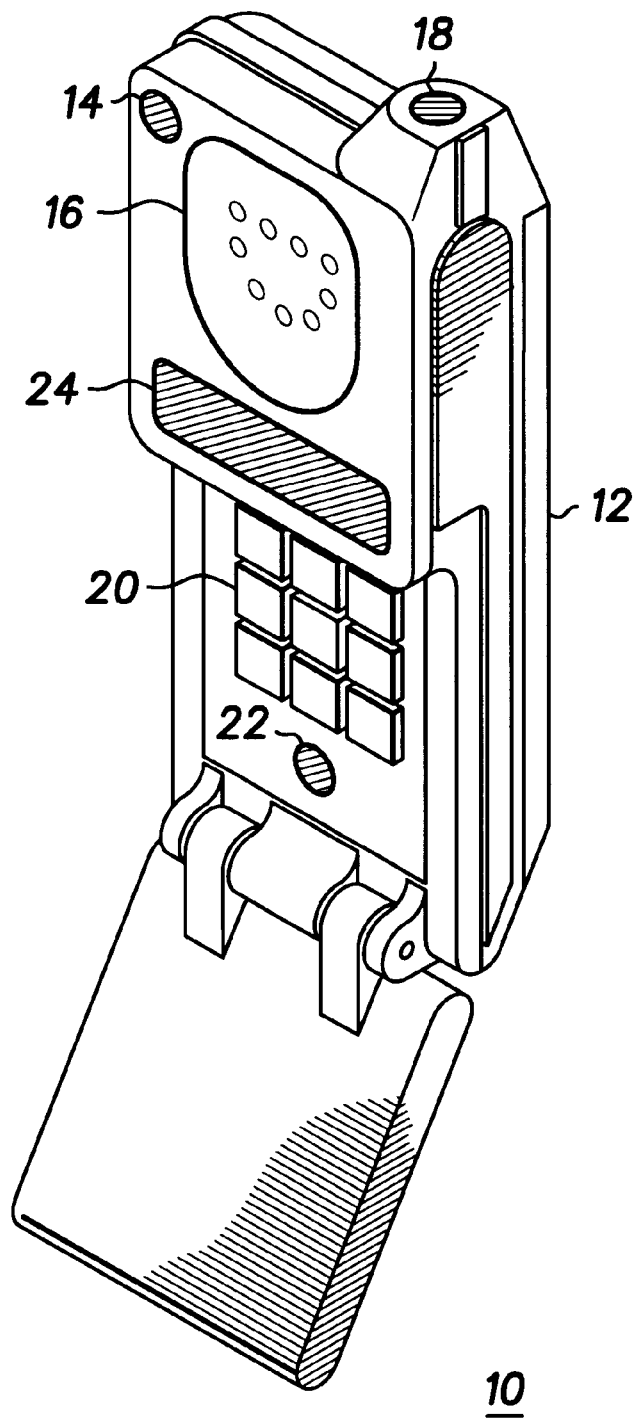
FIG. 1 is a pictorial diagram illustrating a cellular telephone for incorporating a smartcard function therein.

Referring to FIG. 1, a pictorial diagram is shown illustrating the conceptual idea of incorporating a smartcard and its associated functions within cellular telephone 10. Cellular telephone 10 includes cellular telephone circuitry and smartcard circuitry (shown in block form in FIG. 2 and in detailed block form in FIGS. 3 and 4) for performing both a cellular telephone function and a smartcard function. The circuitry for accomplishing the smartcard function includes an RF interface and smartcard logic function circuitry. The RF interface provides a contactless interface between the smartcard logic function circuitry in telephone 10 and an external reader/system. This integration of a contactless smartcard into a cellular telephone function provides ease of use of the smartcard, enhanced security from theft or loss, the ability to read and access information stored within the smartcard by utilizing the cellular telephone display for displaying available smartcard functions, and the ability to update/change information stored within the smartcard by utilizing the cellular telephone functions to electronically communicate with an external system.

Cellular telephone 10 includes casing 12 for housing the electronics for implementing both a smartcard function and a cellular telephone function as will be described and shown in more detail with respect to FIG. 2. Cellular telephone 10 includes on-off switch 14, speaker 16 and cellular telephone antenna 18. Additionally, cellular telephone 10 includes selector buttons 20, voice input/microphone 22 and display 24.

Housing 12 may take the form of any housing for a cellular phone, for example, the housing for Motorola cellular telephones such as the Microtac® phone or Startac® phone.

Figure 2:
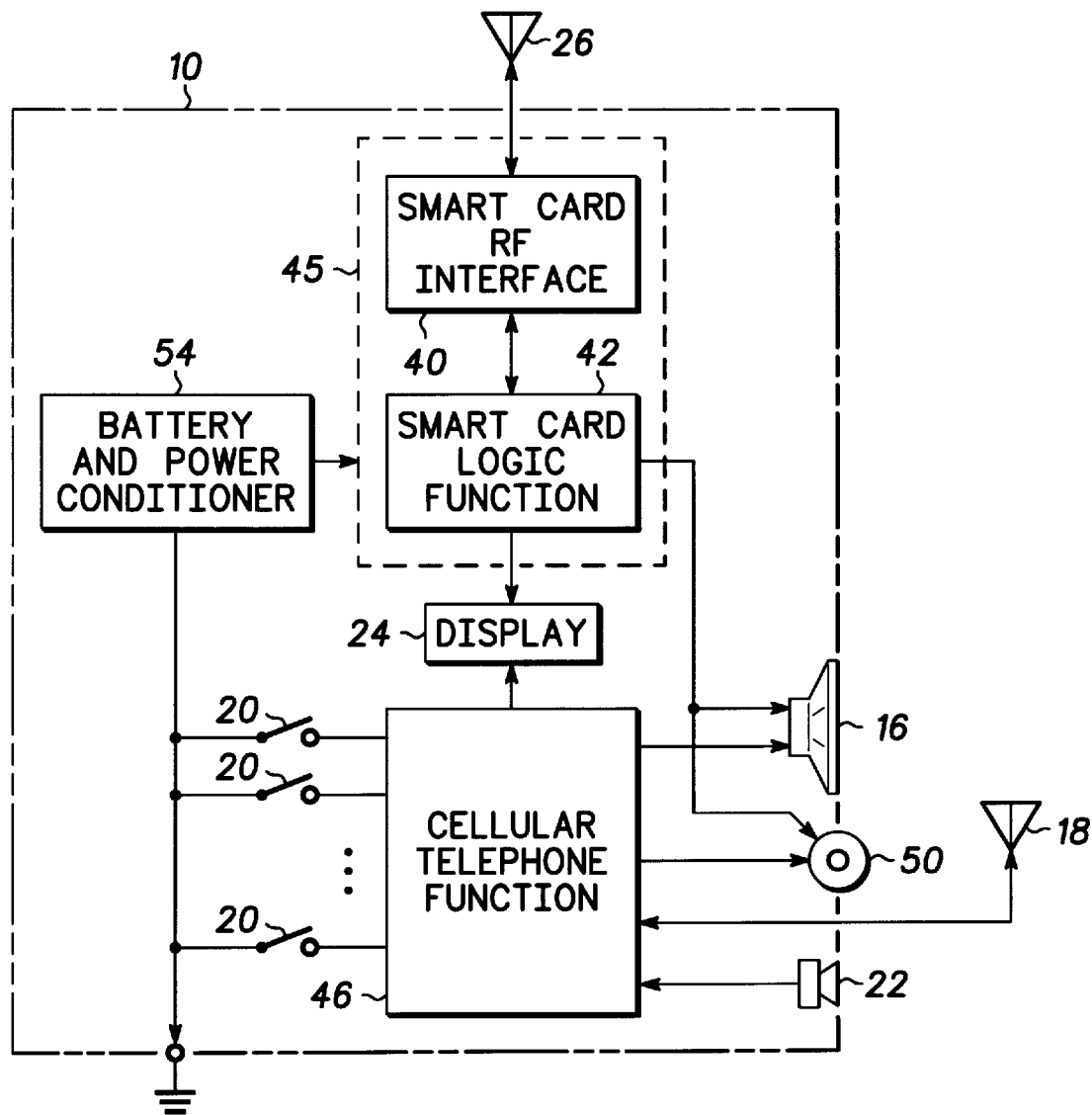
FIG. 2 is a detailed block diagram illustrating the electronics for incorporating both a smartcard function and a cellular telephone function.

Referring to FIG. 2, a detailed block diagram illustrating the electronics associated with cellular telephone 10. As mentioned earlier, cellular telephone 10 includes the electronic circuitry for performing both a cellular telephone function and a contactless smartcard function whereby the human interface that selects the cellular telephone and the smartcard functions is accessed through the selector buttons 20 that are on the exterior of the cellular telephone housing case 12, as shown in FIG. 1 and represented electronically as switches in FIG. 2.

Cellular telephone 10 of FIG. 2 includes smartcard radio-frequency (RF) interface 40 coupled to antenna 26 for transmission and reception of RF data. The transmission/reception of RF data is utilized for performing and executing various smartcard functions while not suffering from the problems described earlier with respect to smartcard contact interfaces.

Figure 3:
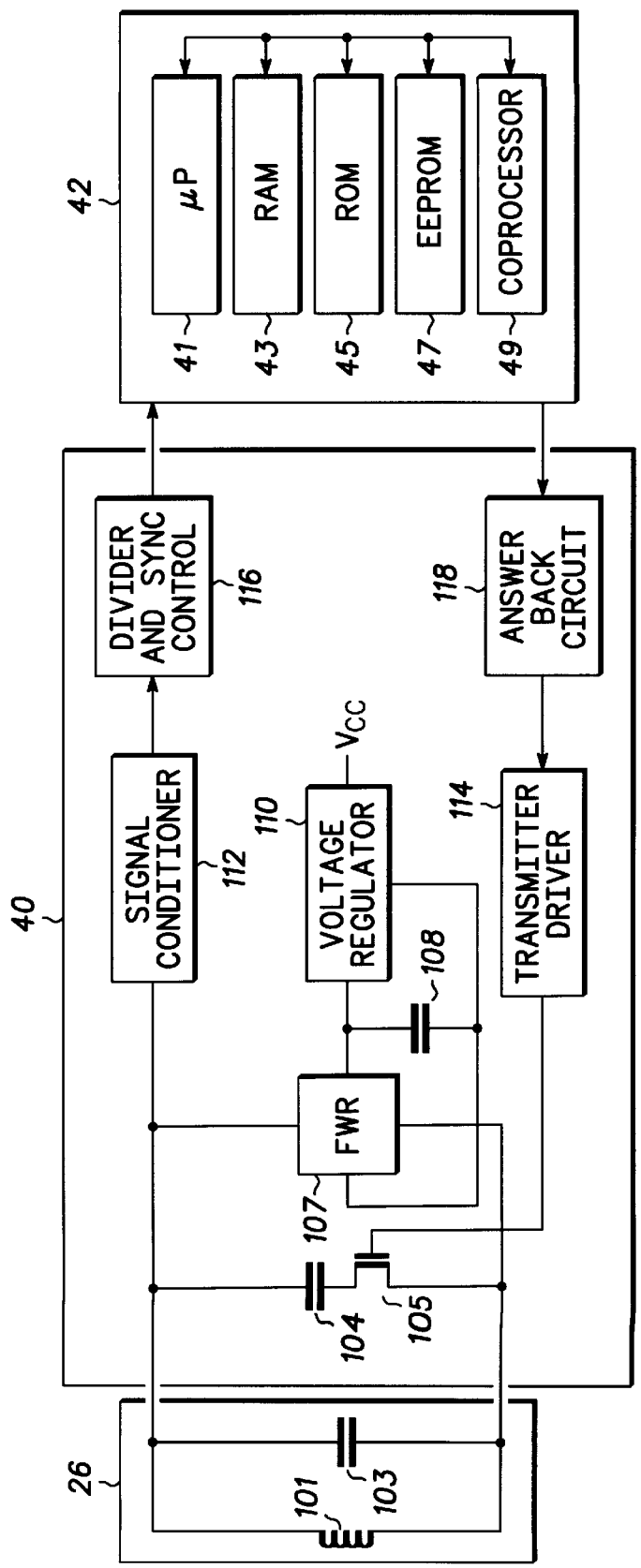
FIG. 3 is detailed block diagram illustrating the electronics associated with the antenna, the smartcard RF interface and the smartcard circuitry of FIG. 2.

Interface 40 is coupled to smartcard logic function circuitry 42 (or simply smartcard circuitry), whereby smartcard circuitry 42 includes electronics, as shown in more detail in FIG. 3, for performing various smartcard functions.

Cellular telephone 10 also includes cellular telephone function circuitry 46 (or simply cellular telephone circuitry) for performing the necessary functions of operating a cellular telephone. Telephone circuitry 46 may take the form of any electronics for performing a cellular telephone function, whereby one embodiment is shown in detail in FIG. 4.

Cellular telephone 10 also includes display 24 coupled to both smartcard logic function 42 and cellular telephone function circuitry 46 for displaying information to a user of cellular telephone 10. Display 24 may take the form of a liquid crystal display (LCD) or light emitting diode (LED) display that is typically incorporated into existing cellular telephones.

Cellular telephone 10 also includes speaker 16 and vibrator 50 coupled to both smartcard logic function circuitry 42 and cellular telephone function circuitry 46 for providing audible or tactile feedback to the user. For example, component 50 may be an audible speaker such as a vibrating cone commonly found in existing cellular phones for providing audible feedback. Alternately, component 50 may be a piezoelectric device for providing tactile feedback via vibration to the skin. Accordingly, the smartcard function may provide feedback to the user audibly or tactually to notify the user of RF interrogation by either an audible beep from the speaker or a vibration that originates within the case.

RF interface 40, smartcard circuitry 42 and cellular telephone circuitry 46 may be fabricated on a single semiconductor integrated circuit 45 for achieving greater reliability and reducing overall cost.

The present invention provides a cellular telephone that incorporates the electronic circuitry for implementing both a cellular telephone function and a smartcard function functions via smartcard circuitry 42 and cellular telephone circuitry 46, respectively. This allows the smartcard electronics to be protected from damage by the housing associated with the cellular telephone and also decreases the likelihood that the smartcard will be lost or stolen.

Referring now to FIG. 3, a more detailed block diagram is shown illustrating the electronic circuitry of antenna 26, smartcard RF interface 40 and smartcard circuitry 42. Smartcard circuitry 42 includes microprocessor unit (MPU) 41, random access memory (RAM) 43, read-only memory (ROM) 45 and electrically erasable read-only memory (EEPROM) 47, and coprocessor 200 for accomplishing various smartcard functions wherein MPU 41 executes instruction stored on ROM 45 and temporarily stores data on RAM 43 and wherein EEPROM 47 is a non-volatile memory which may be used for storing data identifying the uniqueness of smartcard 45. And wherein coprocessor 49 executes security algorithms used to verify the identity of the smartcard and the smartcard infrastructure.

Smartcard antenna 26 may take the form, for example, of capacitor 103 and a wire such as inductor 101. These two components form a tuned circuit that is resonant at the desired frequency of information and/or power transmission into the smartcard. The resonance is modified by the capacitor 104 and FET switch 105 under control of the logic function 42 via the answer back circuit 118 and transmitter driver 114, when information is transmitted out of the smartcard. The answer back circuit 118 receives the digital message from 42, formats and encodes it for RF transmission.

In operation, RF information is received by the antenna 26 and converted to digital data by the signal conditioner 112. Clock extraction, byte and frame synchronization are performed by the divider and sync control block 116. The received information is now passed to MPU 41 for processing.

Power supply voltage Vcc is generated via full-wave rectifier (FWR) 107, which could also take the form of a half-wave rectifier. This rectified voltage is filtered by capacitor 108 and regulated by voltage regulator 110.

Figure 4:
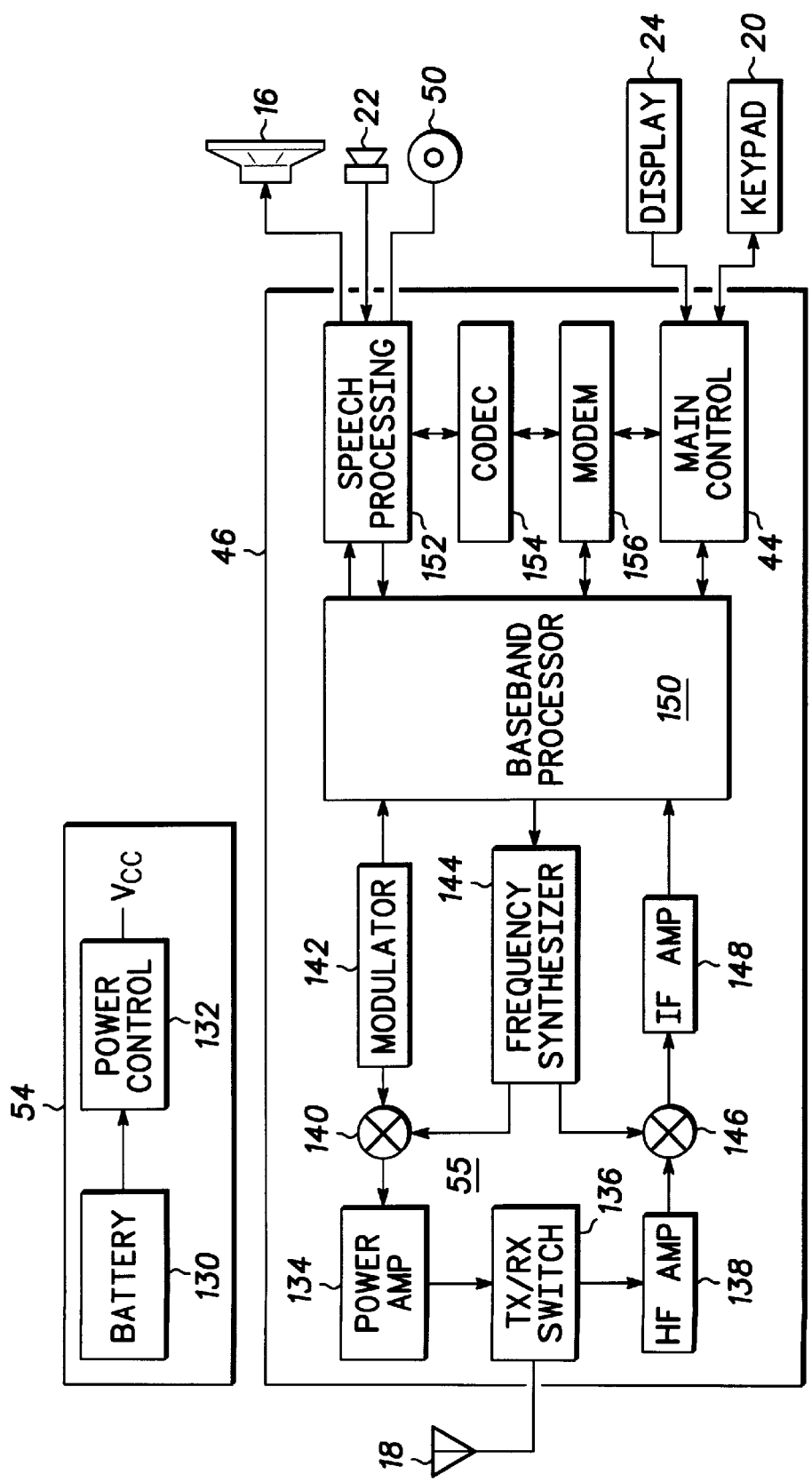
FIG. 4 is a more detailed block diagram illustrating the electronics of the cellular telephone circuitry of FIG. 2.

Referring now to FIG. 4, a more detailed block diagram is shown illustrating the electronic circuitry of cellular circuitry 46 and battery and power conditioner 54 of FIG. 2. Cellular telephone circuitry 46 is powered via battery and power conditioner 54 which comprises a battery 130 and a power control 132.

Cellular telephone circuitry 46 includes RF interface comprising a transmit/receive switch 136 to direct energy in RF interface 55 for receipt of calls via the antenna 18, or to direct energy out of RF interface 55 when transmitting from the phone.

Upon receipt of energy from antenna 18, the signal is amplified by high frequency amplifier 138. The signal is then combined in mixer 146 with a local oscillator signal, supplied by frequency synthesizer 144, and sent to intermediate frequency (IF) amplifier 148. After amplification and filtering, the down converted signal is sent to baseband processor 150 for demodulation and baseband signal recovery.

The recovered signal is then sent, via modem 156, to codec 154 to be converted back to analog signals. The analog signals are processed in speech processor 152 and sent to speaker 16 to be heard by the caller. If modem 156 determines the received signal is command information, it will send the commands to main controller 44 for further processing. Main controller 44 comprises an MPU for executing and performing under program control various cellular telephone functions.

To transmit a voice signal, the caller speaks into microphone 22 resulting in an analog signal which is received by speech processor 152 for filtering. The filtered analog signal is then sent to codec 154 for digitizing. The digitized signal is transmitted, via modem 156, to baseband processor 150 and then to modulator 142 for modulation. The modulated signal is then sent to mixer 140 where it is combined with a local oscillator supplied by frequency synthesizer 144. The up converted signal consisting of the carrier and modulated information is amplified by power amplifier 134. The transmitter/receiver switch 136 then routes the amplified signal to antenna 18 for transmission.

Figure 5:
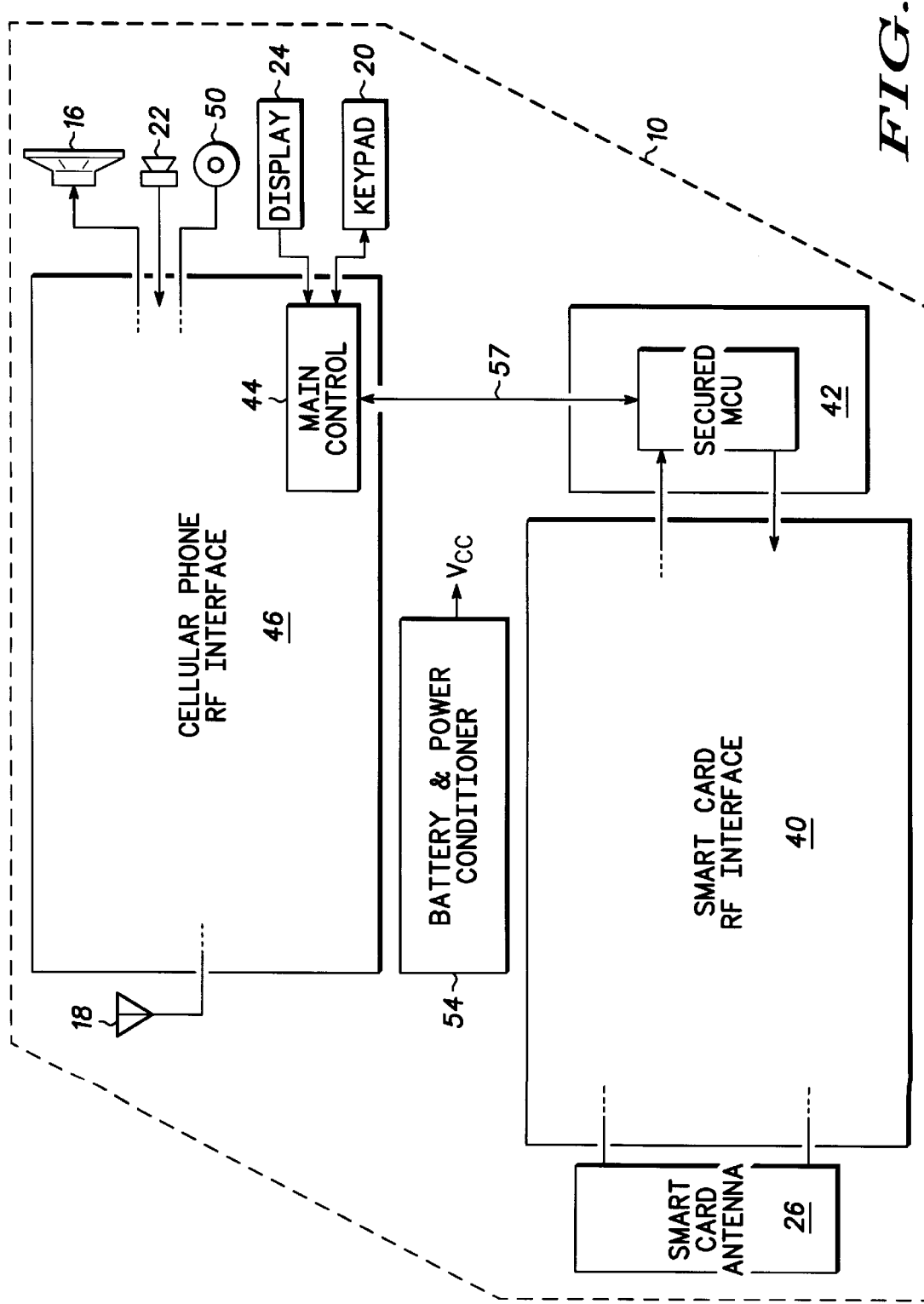
FIG. 5 is a detailed block diagram illustrating the electronics of the cellular telephone circuitry of FIG. 4 and the smartcard circuitry of FIG. 3 combined to form a cellular telephone for implementing both cellular telephone and smartcard functions.

Referring to FIG. 5, a detailed block diagram illustrating the electronic circuitry of cellular telephone circuitry 46 of FIG. 4 and smartcard circuitry 42 of FIG. 3 combined to form a cellular telephone for implementing both cellular telephone and smartcard functions. It is understood that components shown in FIG. 5 that are identical to components shown in FIGS. 3 and 4 are identified by the same reference numbers. Signal line 57, which couples main control 44 of cellular telephone circuitry 46 to smartcard circuitry 42, provides a means for MPU 41 to communicate with main control (MPU) 44 for performing both cellular telephone and smartcard functions. Alternately, the functions of main control 44 and MPU 41 of smartcard logic function 42 may be combined into one single MPU.

Main control 44 of cellular telephone function 46 and smartcard logic function 42 provide appropriate signals to display 24 and speaker 16 for accomplishing cellular telephone and smartcard functions, respectively. For example, main control 44 may provide the currently-dialed telephone number on display 24 and may provide a signal to speaker 16 to generate a ringing sound upon receiving an incoming call. Moreover, smartcard logic function 42 may provide information associated with the smartcard functions, such as current balance, for display on display 24, and may provide audible tone or mechanical vibrations during the smartcard transaction.

Generally, the smartcard function within cellular telephone 10 is interrogated or updated by a smartcard infrastructure using an RF field that is received by the integral smartcard antenna 26 whereby antenna 26 may be the same or separate from antenna 18 associated with the cellular telephone function. Likewise, data from the smartcard is also transferred to the infrastructure using the same antenna. For example, a smartcard infrastructure may be an external system such as an RF card reader associated with a banking institution for performing ATM transactions, or a point-of-sale (POS) system associated with a merchant for performing a sales transaction.

When a user desires to initiate a smartcard function with a corresponding RF reader, the user may, for example, cause cellular telephone 10 to come into the RF power range associated with RF interface 40 so that communication between the reader and cellular telephone 10 may be facilitated. At that point, some initial handshaking may be performed and the reader may then prompt the user to enter a PIN, via selector buttons 20, to ensure that the proper person is in possession of cellular telephone 10. From there, a specific transaction within the capability of smartcard logic function 42 may be executed, for example, a point-of-sale transaction, via a merchant's reader, or the transfer of funds, via an automated teller machine (ATM).

Smartcard data may also be accessed and displayed on display 24 through the use of selector buttons 20. For example, the balance of a smartcard may be displayed on display 24. Additionally, a menu system enabling the display of different data types, for example, medical information or multiple account balances or transaction lists, could also provided on display 24 and of which could be accessed via selector buttons 20.

Moreover, since cellular telephone 10 includes both smartcard and cellular telephone functions, information stored within the smartcard of telephone 10 has the ability to be updated or modified by utilizing the incorporated cellular telephone function. For example, cellular telephone function 46 may access, via the cellular telephone infrastructure, a banking institution while main control 44 communicates with MPU 41 for allowing electronic cash to be downloaded onto the smartcard. In this manner, the smartcard within cellular telephone 10 may be updated via wireless communications by making use of the internal cellular telephone function.

By now it should be apparent that a novel cellular telephone has been provided that incorporates the electronics for implementing both a cellular telephone function and a smartcard function. This allows the smartcard electronic circuitry to be protected from damage by the housing associated with the cellular telephone and also decreases the likelihood that the smartcard will be lost or stolen. The cellular telephone also includes an RF interface for wireless communication between the smartcard and an external reader. Further, by making use of the cellular telephone function, information associated with the smartcard function may be updated or modified via existing cellular telephone infrastructure.

While the invention has been described in conjunction with specific embodiments thereof, many alternatives, modifications and variations will be apparent to those of ordinary skill in the art in light of the foregoing description. Accordingly, the invention is intended to embrace all such alternatives, modifications and variations as fall within the spirit and broad scope of the appended claims.

We claim:

1. A cellular telephone having the capability of performing smartcard functions, comprising:

cellular telephone circuitry, including a main controller, for performing cellular telephone functions;

smartcard circuitry, including a smartcard controller, for performing smartcard functions, said smartcard controller being coupled to said main controller of said cellular telephone circuitry for communicating therewith;

an RF interface, coupled to said smartcard circuitry, for transmitting and receiving information associated with said smartcard functions; and a display for displaying information associated with executing and performing said cellular telephone functions and said smartcard functions;

wherein said smartcard controller and said main controller are implemented within a single microprocessor;

wherein said cellular telephone circuitry is utilized for updating information associated with said smartcard functions; and wherein said smartcard functions include financial transaction functions, wherein said smartcard controller is capable of using said cellular telephone circuitry to contact a banking institution via an external cellular telephone system to obtain financial information relating to a particular account, said smartcard controller using said financial information to update a memory location associated with said account.

2. The cellular telephone according to claim 1 further including a speaker, coupled to said smartcard circuitry and to said cellular telephone circuitry, for providing audible feedback to a user when performing said smartcard functions and said cellular telephone functions.

3. The cellular telephone according to claim 1 further including a vibrator, coupled to said smartcard circuitry and to said cellular telephone circuitry, for providing tactile feedback to a user when performing said smartcard functions and said cellular telephone functions.

4. The cellular telephone according to claim 1 wherein said RF interface utilizes a cellular telephone antenna for transmitting and receiving information associated with said smartcard functions.

5. The cellular telephone according to claim 1 wherein said smartcard circuitry, said cellular telephone circuitry and said RF interface are fabricated on a single semiconductor chip as an integrated circuit.

6. The cellular telephone according to claim 1 wherein said smartcard circuitry and said RF interface are included within a housing of said cellular telephone circuitry.

7. A method for incorporating a smartcard and its associated smartcard functions into a cellular telephone, the cellular telephone including a housing having a display incorporated therein for displaying information to a user and user accessible selector buttons for user command entry, the method comprising the steps of:

obtaining an integrated circuit having cellular telephone circuitry and smartcard circuitry disposed on a single semiconductor chip, said cellular telephone circuitry for communicating with a selected external communications entity via an external cellular telephone system and said smartcard circuitry for use in performing smartcard functions by communicating with an external smartcard reader via a direct external radio frequency (RF) channel between the cellular telephone and the external smartcard reader; and incorporating said integrated circuit into the housing of the cellular telephone so that said integrated circuit is coupled to the display and to the user accessible selector buttons to provide an interface between the user and both said smartcard circuitry and said cellular telephone circuitry;

wherein said smartcard circuitry is electrically coupled to said cellular telephone circuitry on said single semiconductor chip, said smartcard circuitry including means for utilizing said cellular telephone circuitry to contact a remote external entity via the external cellular telephone system for updating information associated with said smartcard functions that is stored in said cellular telephone; and wherein said smartcard functions include financial transaction functions, said means for utilizing using said cellular telephone circuitry to contact a banking institution via the external cellular telephone system to obtain financial information relating to a particular account, said means for utilizing updating a memory location associated with said account using said financial information.

8. The method according to claim 7 wherein said step of obtaining includes obtaining an integrated circuit having cellular telephone circuitry, smartcard circuitry, and an RF interface disposed on said single semiconductor chip, wherein said RF interface provides an interface between said smartcard circuitry and said direct external RF channel.

9. The method according to claim 8 wherein the cellular telephone includes an antenna and wherein the method further includes the step of coupling said RF interface to said antenna for use in transmitting and receiving information associated with said smartcard functions.

10. A cellular telephone comprising:

cellular telephone circuitry for performing cellular telephone functions, said cellular telephone functions including establishing a communications connection between the cellular telephone and a remote communications entity via an external cellular communications system;

a display for displaying information associated with the cellular telephone functions;

smartcard circuitry, including a microprocessor unit (MPU), for performing smartcard functions, said smartcard functions including establishing a communications connection between the cellular telephone and an external smartcard reader via a direct radio frequency (RF) channel between the cellular telephone and the external smartcard reader, said MPU being coupled to said cellular telephone circuitry for communicating therewith; and an RF interface, coupled to said smartcard circuitry, for providing an interface between said smartcard circuitry and said direct RF channel for use in transmitting and receiving information associated with said smartcard functions;

wherein said smartcard circuitry includes means for utilizing said cellular telephone circuitry to update information associated with said smartcard functions that is stored in said cellular telephone;

wherein said smartcard functions include financial transaction functions, said means for utilizing using said cellular telephone circuitry to contact a banking institution via an external cellular telephone system to obtain financial information relating to a particular account, said means for utilizing updating a memory location associated with said account using said financial information.

11. The cellular telephone of claim 10 further comprising a speaker for providing audible feedback to a user when performing smartcard functions.

12. The cellular telephone of claim 10 further comprising an antenna for transmitting and receiving information associated with said smartcard functions.

13. The cellular telephone of claim 10 wherein said smartcard circuitry, said RF interface, and said cellular telephone circuitry are fabricated on a single semiconductor chip as an integrated circuit.

14. The cellular telephone of claim 10 wherein said cellular telephone circuitry, said smartcard circuitry, and said RF interface are included within a housing of the cellular telephone.

* * * * *